Dec. 15, 1964  F. W. SOUTHAM  3,161,500
PROTECTION OF GRAPHITE SURFACES FROM
ATTACK BY ALUMINUM MONOHALIDE
Filed Aug. 4, 1961
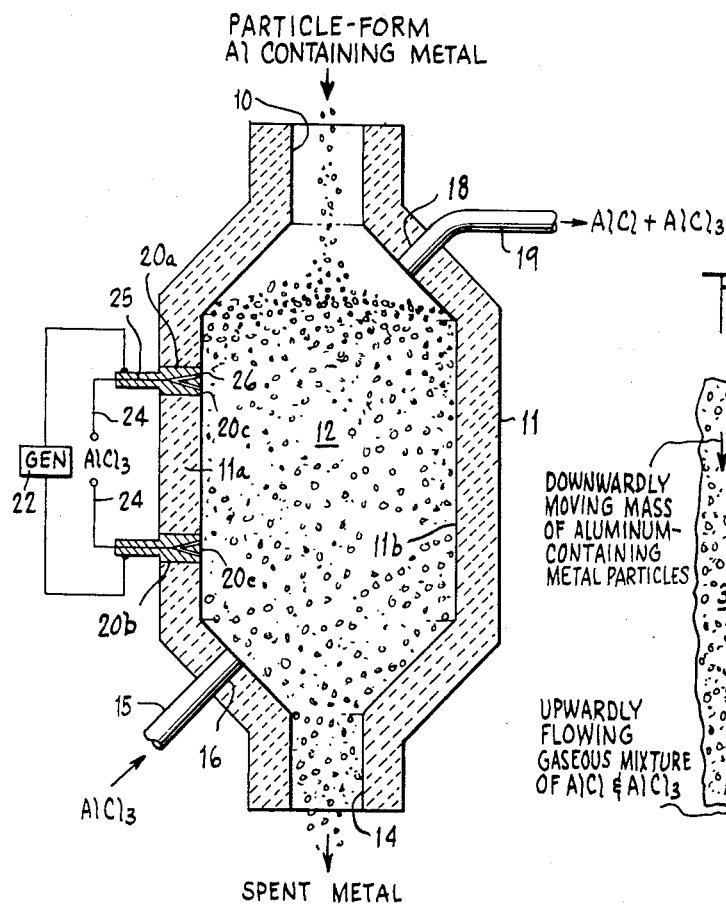
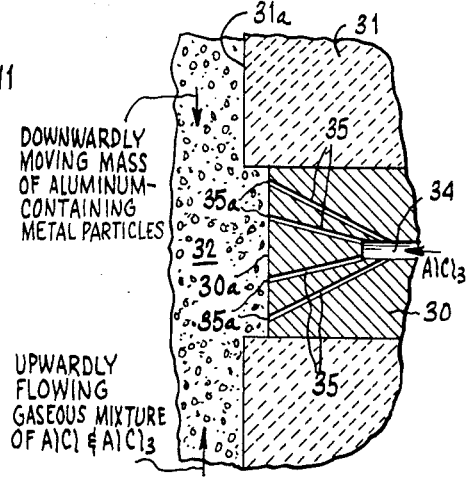
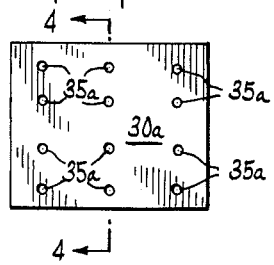
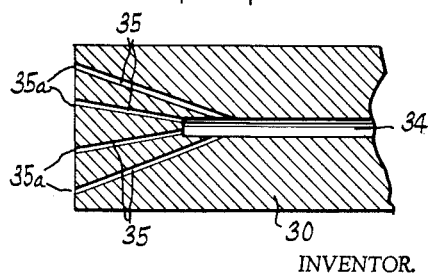
INVENTOR.
FREDERICK WILLIAM SOUTHAM
BY
Robert S. Dunham
ATTORNEY

United States Patent Office 3,161,500
Patented Dec. 15, 1964

3,161,500
PROTECTION OF GRAPHITE SURFACES FROM ATTACK BY ALUMINUM MONOHALIDE
Frederick William Southam, Arvida, Quebec, Canada, assignor to Aluminium Laboratories Limited, Montreal, Quebec, Canada, a corporation of Canada
Filed Aug. 4, 1961, Ser. No. 129,348
4 Claims. (Cl. 75—68)

This invention relates to the protection of graphite surfaces from attack by gaseous aluminum monohalide. In accordance with one embodiment this invention is concerned with an improved subhalide process for the refining of aluminum. In accordance with another embodiment this invention is concerned with an improved graphite electrode suitable for employment in a converter used in the subhalide process for the refining of aluminum. In accordance with yet another embodiment this invention is concerned with an improved converter for use in the subhalide process for the refining of aluminum.

A process for the refining of aluminum, sometimes referred to as the catalytic distillation or subhalide process, involves contacting particle-form aluminum-containing metal at an elevated temperature, e.g. a temperature in the range 1000–1400° C., more or less, and at about atmospheric pressure, although a pressure in the range 5–1500 mm. Hg absolute may be employed, with a gaseous aluminum trihalide, such as gaseous aluminum trichloride, to effect reaction with the aluminum in said metal with the gaseous trihalide to form gaseous aluminum monohalide. The resulting formed gaseous aluminum monohalide is then separately recovered and cooled to effect disproportionation with the resultant formation of elemental aluminum, which is recovered as product, and gaseous aluminum trihalide which is advantageously recycled to the first-mentioned reaction to contact additional, fresh aluminum-containing metal.

The above, generally described subhalide process for the refining of aluminum is usually carried out within a refractory lined, substantially vertically disposed, elongated converter. Fresh particle-form aluminum-containing metal is substantially continuously supplied to the top of the converter and spent metal is substantially continuously withdrawn from the bottom of the converter, the mass of particle-form aluminum-containing metal during the reaction moving downwardly through the converter as a downwardly moving or falling bed. Gaseous aluminum trihalide is introduced into the bottom portion of the converter and the resulting produced gaseous aluminum monohalide, usually in admixture with excess and/or unreacted gaseous aluminum trihalide, is separately recovered from the upper portion of the converter.

The high temperature within the converter necessary to effect the reaction between the aluminum in the particle-form metal therein and the gaseous aluminum trihalide is produced by causing current to flow between electrodes in electrical contact with the mass of particle-form metal within the converter. The electrodes employed are made of graphite. It has been observed, however, that the surfaces of the graphite electrodes exposed to contact with the gaseous aluminum monohalide within the converter deteriorate due to the formation of aluminum carbide which is powdery and is non-adherent, thereby leading to a wearing-away of the graphite electrode face and resultant uneven heating of the metal charge undergoing treatment within the converter. In some instances it is necessary to move the electrodes from time to time within the converter so as to maintain electrical contact with the metal therein.

Accordingly, it is an object of this invention to provide an improved graphite electrode or electrodes for use in the subhalide process for the refining of aluminum.

It is another object of this invention to provide an improved subhalide process for the refining of aluminum.

Still another object of this invention is to provide an improved converter for use in the subhalide process for the refining of aluminum.

Still another object of this invention is to provide a method and means for avoiding or reducing the deterioration of graphite electrodes due to contact with gaseous aluminum monohalide.

How these and other objects of this invention are achieved will become apparent in the light of the accompanying disclosure wherein:

In at least one embodiment of this invention at least one of these objects will be attained.

FIG. 1 is a schematic, vertical cross-sectional view of a converter embodying this invention as employed in the subhalide process for the refining of aluminum;

FIG. 2 is a fragmentary, vertical cross-sectional view showing installation of a graphite electrode in accordance with this invention within the refractory wall of a converter;

FIG. 3 is a side view of the exposed face or contacting surface of a graphite electrode in accordance with this invention; and wherein FIG. 4 is a cross-sectional view taken along line 4—4 of FIG. 3.

In accordance with this invention a graphite surface, such as the exposed surface of a graphite electrode employed in the subhalide process for the refining of aluminum, e.g. the exposed face of a graphite electrode installed in the refractory wall of a subhalide aluminum converter, is protected against attack by gaseous aluminum monohalide, with the resultant formation of powdery, nonadherent aluminum carbide on the graphite surface, by causing a film or blanket or stream of gaseous aluminum trihalide, such as gaseous aluminum trichloride, to be maintained or to flow across or on the exposed graphite surface, thereby excluding gaseous aluminum monohalide from contact therewith. The stream or film or flow of gaseous aluminum trihalide, such as gaseous aluminum trichloride, maintained on the exposed face of a graphite surface, such as the exposed face of the graphite electrode within a subhalide converter, reduces and/or prevents contact of the gaseous aluminum monohalide, such as gaseous aluminum monochloride, with the graphite surface and the resultant formation of powdery aluminum carbide in accordance with the reaction indicated by the chemical equation

$$6AlX + 3C \rightarrow Al_4C_3 + 2AlX_3$$

wherein X is a halogen, such as chlorine.

Although in theory any material compatible in the subhalide process and which excludes gaseous aluminum monohalide from contact with a graphite surface is operable and effective to prevent deterioration of the exposed graphite surface, it is particularly preferred in the practice of this invention to employ gaseous aluminum trichloride as the gaseous medium for excluding the gaseous aluminum monohalide, such as gaseous aluminum monochloride, from contact with the graphite surface.

Referring now in detail to the drawings and particularly to FIG. 1 thereof, which schematically illustrates the principle of this invention as employed in a converter used in the subhalide process for the refining of aluminum, fresh aluminum containing particle-form metal is supplied from a suitable source, not shown, into the top opening 10 of converter 11 to form a mass of particle-form metal 12 within converter 11. A stream of spent metal is continuously or intermittently withdrawn from converter 11 via bottom opening 14. The spent metal thus withdrawn has a substantially reduced aluminum content or is substantially completely depleted of aluminum and is separately recovered for further treatment and recovery of metal values therefrom.

The practice of this invention is particularly applicable to the refining of carbothermic aluminum alloy comprising a major or minor amount of aluminum metal, e.g. such as an amount of aluminum in the range 35–85% by weight, more or less, as might be obtained by the thermal reduction of aluminous material, such as bauxite, by means of coke.

Within converter 11 the downwardly moving or falling mass 12 of particle-form metal is subjected to direct, countercurrent contact with a hot gaseous stream of aluminum trichloride introduced into the lower portion of converter 11 from a suitable source, not shown, via conduit 15 and inlet 16. Simultaneously with the introduction of gaseous aluminum trichloride into the lower portion of converter 11, a gaseous stream comprising aluminum monochloride and aluminum trichloride is substantially continuously withdrawn from the upper portion of converter 11 via outlet 18 and conduit 19. The thus recovered gaseous stream comprising aluminum monochloride and aluminum trichloride is separately treated, such as by cooling, to effect disproportionation of the aluminum monochloride therein to yield elemental aluminum which is recovered as product and aluminum trichloride. The thus-formed aluminum trichloride is advantageously recycled, together with the excess aluminum trichloride present in the gaseous admixture withdrawn from the upper portion of converter 11 via outlet 18 and conduit 19, to converter 11 by suitable means, not shown, to contact additional fresh metal charge therein.

The desired high temperature required to effect reaction between the aluminum in mass 12 of particle-form metal within converter 11 is obtained by electrical heating means. As illustrated, mass 12 of particle-form metal is heated to the desired reaction temperature in the range 1000–1400° C., more or less, by causing current to flow between graphite electrodes 20a and 20b positioned or installed within the refractory wall 11a of converter 11. The exposed faces 20c of graphite electrodes 20a and 20b are in direct electrical contact with mass 12 of particle-form metal within converter 11. By maintaining a suitable potential difference or voltage drop between electrodes 20a and 20b by suitable means, such as generator 22, current is caused to flow between the electrodes through mass 12 of the particle-form metal and to cause the metal to become heated due to the resistance offered by the metal to the flow of current therethrough.

Electrode 20b and exposed face 20c thereof are subjected to relatively little contact with gaseous aluminum monochloride, since most of the reaction between the aluminum, in the particle-form metal of mass 12 and the gaseous aluminum trichloride takes place in the zone within converter 11 intermediate electrodes 20a and 20b. Upper graphite electrode 20a, particularly exposed face 20c thereof, is, however, subjected to contact with gaseous aluminum monochloride in substantial concentrations and, accordingly, is liable to severe attack and deterioration due to the formation of aluminum carbide on the face of the electrode.

The deterioration of the upper electrode 20a, particularly exposed face 20c thereof, is reduced and substantially eliminated and attack of gaseous aluminum monochloride upon the exposed face 20c of electrode 20a is avoided by causing a film or blanket of gaseous aluminum trichloride to be maintained on and/or flow along the exposed face 20c of electrode 20a. This blanket or film or stream of gaseous aluminum trichloride is maintained on the exposed face 20c of electrode 20a by supplying gaseous aluminum trichloride from a suitable source, not shown, via conduit means 24 to passageway 25 provided within graphite electrode 20a. Passageway 25, in turn, communicates with openings 26 on face 20c of the graphite electrode for the discharge of the gaseous aluminum trichloride. In this manner, by flowing a stream of gaseous aluminum trichloride via conduit means 24 and passageway 25 through openings 26, a blanket or film of gaseous aluminum trichloride is maintained along exposed face 20c of electrode 20a to substantially completely exclude gaseous aluminum monochloride from contact therewith, thereby preventing deterioration of face 20c of graphite electrode 20a due to formation of aluminum carbide.

Although electrode 20b is less liable to attack by gaseous aluminum monochloride than upper electrode 20a, suitable means in accordance with this invention might also be employed, as illustrated, herein and described hereinabove with relationship to upper electrode 20a to protect face 20c of lower electrode 20b.

In the illustration of the practice of this invention shown in FIG. 1 of the drawings, two electrodes 20a and 20b are shown. In actual practice any suitable number of electrodes may be employed and similarly protected against attack by gaseous aluminum monochloride by following the practices of this invention. Also, the electrodes employed in association with the converter may assume any suitable shape and/or size, e.g. plug type electrodes, annular type electrodes or combinations thereof. In FIG. 1 the faces 20c of the electrodes are indicated as being substantially flush or coplanar with respect to the inside surface 11b of converter 11.

With respect to the relationship of the exposed surface of the graphite electrode to the inside surface of the converter within which the electrodes are installed and associated, it is advantageous and, accordingly, a feature of this invention, to recess the exposed face or surface of the graphite electrode within the wall or inside surface of the converter. This embodiment and the feature of the invention is better illustrated in FIG. 2 of the drawings.

Referring now to FIG. 2 of the drawings which shows in a fragmentary cross sectional view the installation of a graphite electrode within the wall of the converter, graphite electrode 30 is fitted and disposed within the refractory wall 31 of the converter such that the exposed surface 30a of electrode 30 is recessed with respect to the inside surface 31a of refractory wall 31 of the converter. As indicated in FIG. 2 the downwardly moving mass of aluminum-containing metal particles 32 make contact with the exposed face or surface 30a of electrode 30 while being subjected to contact with an upwardly flowing stream or gaseous mixture containing monochloride.

As illustrated, gaseous aluminum trichloride is continuously supplied from a suitable source through passageway 34 within electrode 30 and then through distributing conduits 35 to openings 35a on face 30a of electrode 30. By recessing the exposed surface 30a of graphite electrode 30 within the refractory wall 31 of the converter, a more effective blanket or film, stagnant-like, is created over the exposed face 30a of electrode 30, thereby assuring better protection of electrode face 30a against attack by the gaseous monochloride flowing upwardly through the mass of particle-form aluminum-containing metal 32 within the converter and in contact with face 30a of graphite electrode 30. Actual tests have shown that by recessing the exposed face of the electrode to be protected the amount of gaseous aluminum trichloride required to flow across the exposed face of the electrode to protect it against attack by gaseous aluminum monochloride is very substantially and drastically reduced.

Referring now to FIGS. 3 and 4 of the drawings, there is illustrated therein in greater detail the electrode 30 somewhat schematically illustrated in FIG. 2. The same reference numerals employed in connection with FIG. 2 have been employed in FIGS. 3 and 4 to identify and to refer to the same elements.

In general, the rate of supply of gaseous aluminum trichloride through the graphite electrodes to protect the exposed faces thereof against attack by gaseous aluminum monochloride is determined by the geometry of the electrode face with respect to the inner cavity or surface of the converter, by the concentration of the aluminum monochloride in the gas in contact with the exposed electrode face and by the upward gas flow rate of the gaseous admixture in contact with the electrode face.

One or a plurality, preferably a plurality, of holes or outlets are provided on the face of the electrodes to be protected for the supply of the gaseous aluminum trichloride employed to form a stream or film over the face of the electrode. For example, an array of spaced holes having a diameter in the range 0.1–0.5 inch, such as 0.25 inch, and spaced on 1–4 inch, such as 2 inch, centers affords a suitable number of outlets so as to provide an effective protective film or blanket of gaseous aluminum trichloride across the exposed face of the electrode. Other suitable means extraneous of the electrode, such as separate extraneous conduit means provided within the converter and extending through the refractory walls thereof, may be employed to form a protective blanket or stream of gaseous aluminum trihalide across the exposed face of the graphite electrode.

As indicated hereinabove, it is a feature of this invention to recess the exposed face of the graphite electrode with respect to the inner surface of the refractory wall of the converter, thereby effecting an economy in the amount of gaseous aluminum trichloride necessary to satisfactorily protect the face of the graphite electrode against attack by gaseous aluminum monochloride. Specifically, when the exposed face of the graphite electrode is recessed within the inside or refractory wall of the converter, it has been determined that a flow of 10 pounds of gaseous aluminum trichloride per hour per square foot of electrode face provides adequate protection of the electrode against attack by gaseous aluminum monochloride while at the same time contributing negligible dilution of the product gas, the gaseous admixture of aluminum monochloride and aluminum trichloride withdrawn from the upper portion of the converter, such as in the converter producing up to three tons of aluminum per hour. When, however, the electrode face is flush with the inner wall of the converter, it has been determined that the flow of gaseous aluminum trichloride necessary to effect satisfactory protection of the exposed electrode face must be increased to about 100 pounds of gaseous aluminum trichloride per hour per square foot of electrode face. Any suitable set-back or recessing of the exposed graphite electrode face to be protected while at the same time affording satisfactory electrode contact with the mass of particle-form aluminum-containing metal undergoing treatment may be employed. It has been determined that there is no difficulty in operating a converter wherein the electrode face is recessed one inch back from the inside surface of the wall of the converter. Accordingly, it is contemplated that satisfactory results are obtainable in the practices of this invention when the exposed electrode face is recessed up to as much as 2 inches, more or less, within the wall of the converter.

Although in the foregoing description of the practices of this invention emphasis has been placed on the protection of graphite surfaces from attack by aluminum monochloride, other materials subject to attack by aluminum monochloride are similarly protected. For example, carbon, as opposed to graphite, which has the same chemical properties as graphite but substantially different physical properties, e.g. higher electrical resistivity and poorer machining characteristics than graphite, is also similarly protected.

As will be apparent to those skilled in the art in the light of the foregoing disclosure, many modifications, alterations and substitutions are possible in the practice of this invention without departing from the spirit or scope thereof.

What is claimed:

1. In a method wherein a mass of particle-form aluminum-containing metal is disposed within a vertically extending converter, said mass of particle-form aluminum-containing metal moving downwardly within said converter in direct countercurrent contact with an upwardly flowing stream of gaseous aluminum trihalide and wherein graphite electrodes are provided in the wall of said converter in contact with said mass of particle-form aluminum-containing metal for the supply of electrical current to said mass of particle-form metal to heat same so as to bring about reaction between the aluminum in said metal and the gaseous aluminum trihalide with the resultant formation of gaseous aluminum monohalide and wherein the resulting formed gaseous aluminum monohalide tends to contact the exposed surfaces of said graphite electrodes within said converter with the resultant deterioration of the surface of said graphite electrodes due to the formation of aluminum carbide thereon, the improvement in combination therewith which comprises preventing the deterioration of the exposed surfaces of said graphite electrodes within said converter by recessing said electrodes in the wall of said converter to provide recessed, exposed surfaces of said graphite electrodes within said converter and supplying a sufficient flow of gaseous aluminum trihalide to the recessed, exposed surfaces of said graphite electrodes so as to maintain a film of gaseous aluminum trihalide on the recessed, exposed surfaces of said graphite electrodes so as to substantially exclude said gaseous aluminum monohalide from contacting the exposed graphite surfaces of said recessed electrodes.

2. A method in accordance with claim 1 wherein said aluminum-containing particle-form metal is a carbothermic aluminum alloy.

3. A method in accordance with claim 1 wherein said aluminum trihalide is aluminum trichloride and wherein said aluminum monohalide is aluminum monochloride.

4. A method in accordance with claim 1 wherein said aluminum-containing particle-form metal is a carbothermic aluminum alloy, wherein said aluminum trihalide is aluminum trichloride and wherein said aluminum monohalide is aluminum monochloride.

References Cited in the file of this patent

UNITED STATES PATENTS

| | | |
|---|---|---|
| 430,453 | Wilson | June 17, 1890 |
| 1,020,546 | Fleming | Mar. 19, 1912 |
| 1,034,788 | Greene | Aug. 6, 1912 |
| 1,111,341 | Wile | Sept. 22, 1914 |
| 2,226,525 | Dolan | Dec. 24, 1940 |
| 2,937,082 | Johnston et al. | May 17, 1960 |